March 26, 1963  H. M. LARSEN  3,082,856
MULTIPLE STATION MACHINE TOOL
Filed Dec. 14, 1961  2 Sheets-Sheet 1

INVENTOR
H. M. LARSEN
BY
A.C. Schway Jr.
ATTORNEY

March 26, 1963 H. M. LARSEN 3,082,856
MULTIPLE STATION MACHINE TOOL
Filed Dec. 14, 1961 2 Sheets-Sheet 2
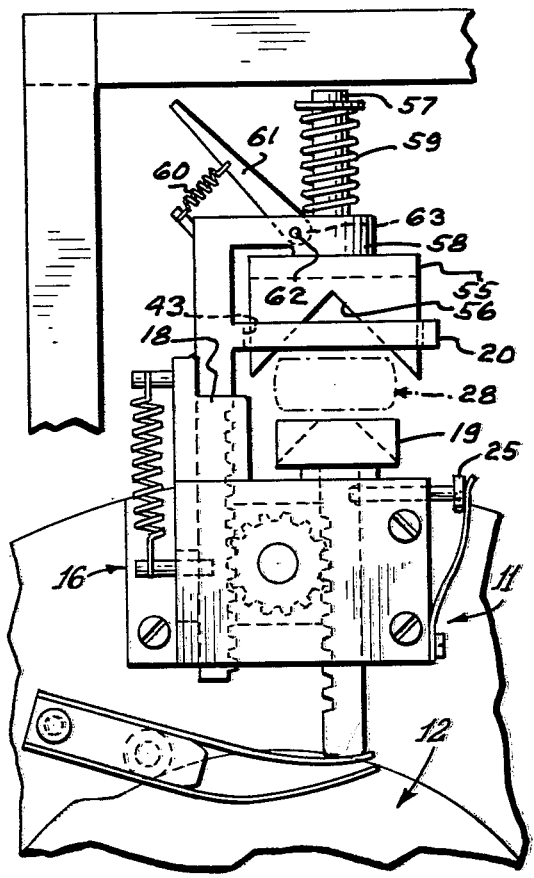
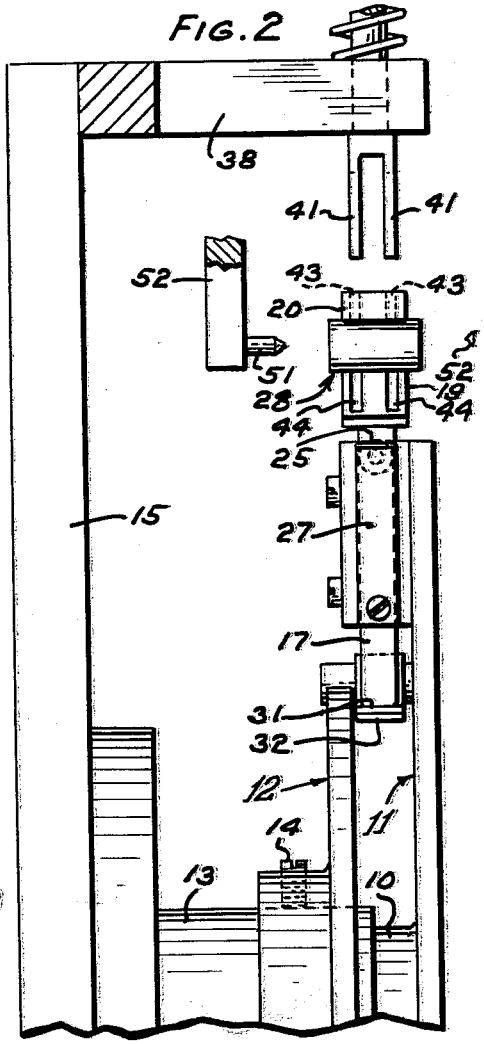
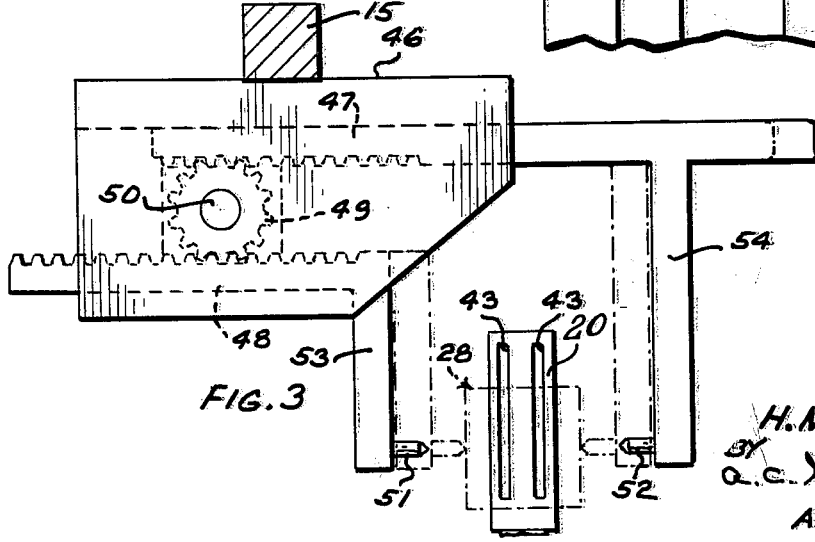
INVENTOR
H. M. LARSEN
BY
A. C. Schwarz Jr.
ATTORNEY United States Patent Office 3,082,856
Patented Mar. 26, 1963

3,082,856
MULTIPLE STATION MACHINE TOOL
Henry M. Larsen, Estherville, Iowa, assignor to Western Electric Company, Incorporated, New York, N.Y., a corporation of New York
Filed Dec. 14, 1961, Ser. No. 159,266
10 Claims. (Cl. 198—33)

This invention relates generally to a machine tool of the process type, and more specifically to a multiple station machine tool for three-dimensionally centering varied sized elements such as capacitors.

With particular reference to electrical capacitor components, industry requirements dictate that the capacitor leads be connected to the body of the capacitor in substantially exact alignment with the geometrical center thereof. In general, multiple station machine tools are advantageously employed in assembling operations because the individual piece parts forming the component can be continuously fed to a succession of stations, the assembled component being ejected from the tool by one of the stations. When the component is of relatively light weight and of small size, the relatively small and compact rotary-type process machine is usually preferred by those working in the art to the larger line-type of process machines which employ conveyor belts. Since capacitors are relatively small, it is to the rotary type of process machine that the present invention is primarily directed; however, it will be evident to those skilled in the art that the teachings of this invention may also be applied to the aforementioned line-type machines.

To achieve the assembly of the capacitor leads to the center of the body of the capacitor in accordance with conventional practice, the capacitor body would be secured in the multiple process type of machine by piece part clamping members at the loading station. The clamping members would thereafter be indexed to carry the body to a work station for lead connection thereto by a commercial lead connecting device positioned at that station. Typical lead connecting devices, for example, comprise a pair of fixed dies for feeding lead wires to predetermined points on the body and a soldering element for soldering the wires to the body at those points. As mentioned above, these points should preferably be in precise alignment with the geometrical center of the body.

Since the clamping members necessarily follow an established path of movement, and since the feeding dies are generally fixed relative to this path, the two points on the capacitor body to which the lead wires are to be soldered would therefore be ascertained from the dimensions of a typical or standard sized capacitor body. It will be evident that should the dimensions of a particular capacitor body indexed to the work station vary from that of the standard, the lead wires fed from the dies of the lead connecting device will probably be affixed to the body at points which are not aligned with the geometrical center thereof. Usually, capacitors vary considerably in body size in three dimensions from code to code, and also vary materially in body size within a given code. Although individual machines theoretically could be provided for each code, the positioning problem resulting from variations in body size within the code would still exist.

Broadly, it is an object of this invention to provide a multiple station machine tool that three-dimensionally centers a piece part with respect to the work stations of the tool.

More specifically, it is an object of this invention to provide a machine tool including a piece part conveyor and a succession of piece part centering and work stations located adjacent the conveyor, the piece part centering stations three-dimensionally centering varied sized piece parts on the conveyor so that the geometrical centers of the piece parts are consistently presented in alignment with work performing devices at the work stations.

Another object of this invention is to provide a machine tool including a rotary conveyor and a succession of piece part centering and work stations located adjacent the conveyor, wherein the piece part is vertically centered and loosely clamped at a first centering station to the conveyor, horizontally centered at a subsequent centering station, and thereafter firmly secured to the conveyor for presentation to subsequent work stations.

According to a preferred embodiment of this invention, a multiple station machine tool is provided which includes an endless rotary conveyor and a succession of piece part centering and work stations located adjacent the conveyor. A pair of clamping jaws are mounted to rotate with the conveyor, the jaws receiving and transferring the piece part from a first piece part centering station to successive centering and work stations. The clamping jaws are interconnected and movable toward each other at the first centering station to center and loosely clamp the piece part vertically therebetween with sufficient force so that the piece part will not slide from between the jaws upon rotation thereof. At a second centering station, a pair of piece part positioning members coact to position horizontally the loosely clamped piece part indexed to that station in directions parallel and transverse to the longitudinal axis of the piece part. A cam surface of varying contour is disposed proximate the conveyor and a camming device contacts the cam surface and pivots as a result of engaging a variation in cam surface contour. The camming device is connected to the conveyor and to the clamping jaws and drives the clamping jaws toward each other upon pivotal movement thereof. The cam surface has a contour variation subsequent to the first centering station and prior to the second centering station of a size such that the camming device drives the clamping jaws together, the force applied by the clamping jaws being sufficient to prevent the piece part sliding from between the jaws, and yet not great enough to prevent movement of the piece part by the positioning members at the second centering station. The contour of the cam surface varies subsequent to the second centering station causing further pivotal movement of the camming device, whereupon the clamping jaws are additionally moved to clamp the piece part more firmly therebetween so that the part is three-dimensionally centered and firmly secured to the rotary conveyor upon arrival at the work stations.

Other objects, advantages and novel aspects of the invention will become apparent upon reference to the following detailed description, taken in conjunction with the appended drawings, in which:

FIG. 2 is a view of FIG. 1 taken along section lines 2—2 of that figure, showing the piece part positioning members for horizontally positioning the piece part at the second centering station in a direction transverse to the longitudinal axis thereof;

FIG. 3 is a view of FIG. 1 taken along section lines 3—3 of that figure and shows the mechanism for positioning the part longitudinally in a direction parallel to the longitudinal axis thereof; and FIG. 4 is a side view of another embodiment of the machine tool of this invention to provide additional gripping to slippery parts.

Figure 1:
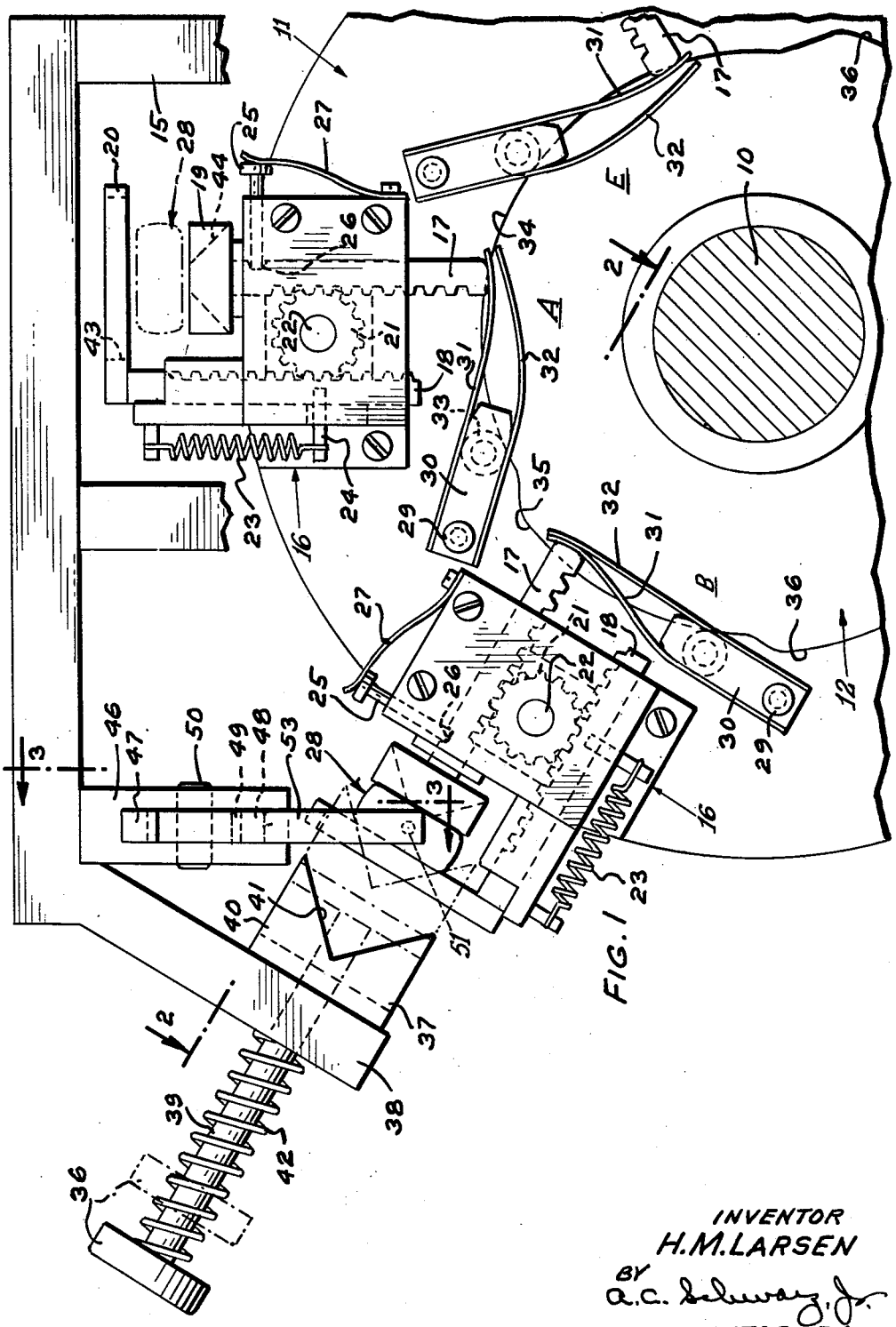
FIG. 1 is a side elevation of the multiple station machine tool of this invention.

Referring now to FIG. 1 for a more complete understanding of the machine tool of this invention, there is shown a shaft 10 supporting a vertically disposed circular conveyor plate 11 for rotation therewith. A conventional drive motor (not shown) is geared to shaft 10 for producing rotation thereof. A cam 12 is positioned adjacent the plate 11 and is secured to a stationary sleeve 13 by any suitable device such as a machine screw 14 (FIG. 2), the shaft 10 and the sleeve 13 being respectively mounted on a right angled frame member 15.

The conveyor plate 11 has a mounting block 16 secured thereto, the block 16 slidably supporting a pair of oppositely movable gear racks 17 and 18 and the racks being respectively formed with clamping jaws 19 and 20. A gear 21 is rotatably mounted on a shaft 22, the shaft 22 having the ends thereof secured in the mounting block 16. The gear 21 meshes with each of the gear racks 17 and 18 to interconnect the racks for movement toward and away from each other in unison. A coil spring 23 is connected at the upper end thereof to the block 16, is connected at the lower end through a pin 24 to the rack 18, and tensions the jaws to an open position. A pin 25 engages a slot 26 at the end thereof and in the rack 17 and releasably locks the jaws in a fixed, open position, as shown in FIG. 1, for receiving a capacitor body 28 of essentially rectangular shape. A leaf spring 27 connected to the block 16 resiliently biases the pin 25 into the slot 26, the resiliency of the leaf spring 27 being such that the pin 25 can be withdrawn from the slot when it is desired to effect upward movement of the rack 17.

A pin 29 mounts a spring block 30 to the plate 11 for pivotal movement thereon, the block 30 having secured thereto a pair of leaf springs 31 and 32 which extend beneath the gear rack 17, the leaf spring 31 being substantially less flexible than the leaf spring 32. The leaf spring 31 has sufficient resiliency to urge the jaws 19 and 20 together so that they can clamp the capacitor body 28 with enough force to prevent sliding of the body from between the jaws during rotation thereof but with insufficient force to prevent horizontal positioning of the body 28 at a subsequent centering station, whereas the spring 32 is capable of imparting considerably more force to the bottom of the rack 17 so that the body 28 is secured firmly between the jaws 19 and 20. The coaction of the jaws 19 and 20 effects vertical centering of the body 28 with respect to a succeeding station.

The spring block 30 mounts a revolvable cam follower 33 thereon, the cam follower 33 being positioned to ride upon the periphery of the stationary cam 12 upon rotation of the plate 11. The cam 12 is formed with circular cam surfaces 34, 35 and 36 of successively increasing radii, the arcs formed by these surfaces being concentric with the center of rotation of the plate 11. Cam surfaces 34 and 35 are positioned opposite what will hereinafter be referred to as the first and second piece part centering stations, respectively, of the machine tool. The first and second piece part centering stations are referred to by letters A and B, respectively, and at these stations, the plate 11 will stop long enough to permit the accomplishment of the required centering operations.

The right angled frame 15 also mounts a support arm 38 which extends over the cam surface 35 as shown in FIG. 1. Mounted adjacent the extremity of the support arm 38 is a reciprocatively movable plunger 39 that includes a block 40 having therein a pair of V-shaped jaws 41. A coil spring 42 urges the plunger 39 outwardly until the block 40 abuts the support arm 38, as shown. The V-shaped jaws 41 are movable to the dotted line position against the compression of the coil spring 42 (FIG. 1) upon downward movement of the plunger 39, through rectangular slots 43 formed in the clamping jaw 20 to horizontally center the capacitor body 28 loosely clamped in the clamping jaws 19 and 20 in a direction transverse to the longitudinal axis of the body. A pair of diverging slots 44 are formed in the clamping jaw 19 to accommodate the jaws 41 when the capacitor body is of such small size that the jaws 41 would otherwise contact the jaw 19 upon downward movement thereof.

To center horizontally in directions parallel to the longitudinal axis of the capacitor body 28, a block 46 (FIG. 3) is provided and is affixed to the underside of the support arm 38, FIG. 2. The block 46 houses a pair of gear racks 47 and 48 for sliding movement therein. A gear 49 is rotatably mounted on a shaft 50 having the ends thereof secured in the block 46 (FIG. 1), and meshes with each of the gear racks 47 and 48, thereby interconnecting the racks for movement toward and away from each other in unison, so that a pair of positioning pins 51 and 52 extending from arms 53 and 54 can also be moved in unison to position the ends of the capacitor 28, as indicated by the dotted lines in FIG. 3.

The cam surface 36, FIG. 1, is positioned opposite the third and fourth stations (not shown) which are the work stations of the machine tool. At the third station, the capacitor body 28 is cleaned and at the fourth station a lead wire feeding and soldering device attaches the lead wires to the capacitor body. As mentioned hereinbefore, the lead wire feeding and soldering device generally includes a pair of stationary dies which are designed to feed the capacitor lead wires in precise alignment with the geometrical center of a piece part held in the clamping jaws 19 and 20. A conventional soldering element is thereafter utilized to solder the lead wires to the body 28.

The fifth station (not shown) is opposite cam surface 34 and indicated by letter E, FIG. 1. At this station the jaws 19 and 20 will be separated by counterclockwise movement of the spring block 30 to permit release and unloading of the assembled capacitor.

In operation, the capacitor body 28 is loaded between the clamping jaws 19 and 20 at the first centering station A, these jaws being held open by the pin 25 in the slot 26 and the pin thereafter withdrawn causing the jaws to close. The conveyor plate 11 is indexed in a counterclockwise direction as viewed in FIG. 1, whereupon the cam follower 33 travelling from the cam surface 34 onto the cam surface 35 pivots the spring block 30 counterclockwise causing the leaf spring 31 to urge the gear rack 17 radially outward from the center of the plate 11. Upon outward movement of the gear rack 17, the gear 21 simultaneously drives the gear rack 18 downwardly and the clamping jaws 19 and 20 move toward each other to center the body 28 in a vertical direction with respect to the conveyor plate 11. The leaf spring 31 exerts just enough force against the jaw 19 to prevent the capacitor body 28 from sliding out between the jaws 19 and 20 upon further rotation of the plate 11.

When the plate 11 has been indexed to the centering station B, the V-shaped jaws 41 are moved into engagement with the capacitor body 28 to center the body 28 in a direction transverse to the longitudinal axis, and the positioning pins 51 and 52 are now moved toward each other in unison so as to center the body 28 in directions parallel to the longitudinal axis thereof, thus completing three dimensional centering of the body 28 between the clamping jaws 19 and 20. The V-shaped jaws 41 and positioning pins 51 and 52 are then retracted and the circular plate 11 is again indexed counterclockwise, whereupon the cam follower 33 moves from the cam surface 35 onto the cam surface 36 producing further counterclockwise movement of the spring block 30. Further movement of the spring block 30 causes the leaf spring 32 to impart an additional force to the gear rack 17, whereby the gear racks 17 and 18 are additionally moved together to clamp securely the capacitor body 28 for the subsequent indexing to the work stations. Regardless of body size variations, a body 28 in the clamping jaws 19 and 20 will always have its geometrical center located in the same position with respect to the fixed dies (not shown) at the fourth station which feed lead wires to the capacitor body.

When the circular plate 11 reaches the fifth station

E, the cam follower 33 travels from the cam surface 36 to the cam surface 34, to release the spring bias against the bottom of the gear rack 17 sufficiently to permit the spring 23 to contract and thereby move the clamping jaws 19 and 20 away from each other, thereby releasing the capacitor for removal from the machine tool.

A modified form of the invention at the first centering station is shown in FIG. 4. This embodiment is capable of providing additional gripping of slippery capacitor bodies during indexing to the work stations. As illustrated in FIG. 4, a centering block 55, formed with V-shaped jaws 56, is secured to the end of a rod 57 slidable in an arm 58 extending from the gear rack 18 to a position above the clamping jaw 20. The rod 57 is biased upwardly by a coil spring 59 which is connected at the upper end thereof to the rod 57 and abuts against the arm 58 at the lower end thereof. A spring 60 connected to the arm 58 and to a cam lever 61 biases the cam lever 61 counterclockwise, the lever being mounted for pivotal movement on the arm 58 by a pin 62. The cam lever 61 has a cam end 63 which is biased by the spring 60 to bear against the rod 57. Upon downward movement of the rod 57, the block 55 will be held in any desired position by the spring-biased cam end 63 bearing against the rod 57.

The capacitor body 28 is inserted between the jaws 19 and 20 at the first centering station and the pin 25 withdrawn so that the jaws 19 and 20 can vertically center the body 28. Thereafter, the plunger 57 is driven downwardly until the jaws 56 horizontally center the body 28 transversely of the longitudinal axis thereof, the plunger 57 being held in this position by the cam end 63. Upon rotation of the plate 11 to station B, the positioning pins 51 and 52 coact to center the body 28 in the direction parallel to the longitudinal axis thereof, the jaws 56 permitting sliding of the body 28 during the positioning by the pins 51 and 52. After the positioning pins 51 and 52 have performed their centering operation, the plunger 57 is displaced downwardly an additional amount so that the jaws 56 can grip the body 28 firmly between the jaws 19 and 20, the cam 63 serving to hold the plunger 57 in this position. On arrival at station E, the cam lever 61 is pivoted clockwise to release the cam end 63 from the gripping rod 57. At station E, the spring block 30 rotates clockwise, as viewed in FIG. 1, releasing the pressure imparted by the springs 31 and 32 against the jaw 19, and allowing the spring 23 to open the jaws for removal of the assembled capacitor.

Although the horizontal positioning members are disclosed as being manually operated, it will be evident to those skilled in the art that the positioning operations could be made automatic by providing hydraulic or other suitable driving means to actuate the horizontal positioning members. The driving means could, for example, be initiated by switches that open or close when the conveyor plate is indexed.

Numerous other arrangements may be devised by those skilled in the art which will embody the principles of the invention and fall within the spirit and scope thereof.

What is claimed is:

1. A process-type machine tool including a conveyor and a succession of piece part centering and work stations disposed adjacent the conveyor, the tool comprising: a pair of clamping members carried by the conveyor for receiving and transferring a piece part from a first piece part centering station to a second centering station, said clamping members being interconnected and movable toward each other at the first station to center the piece part vertically therebetween, piece part positioning means coacting at the second centering station to horizontally position the piece part received thereby in directions parallel and transverse to the longitudinal axis of the piece part, and means actuated by conveyor movement located subsequent to the second centering station for driving said clamping members closer together so that the three-dimensionally centered piece part is secured to the conveyor upon arrival at the work stations.

2. A process-type machine tool including a conveyor and a succession of piece part centering and work stations disposed adjacent the conveyor, the tool comprising: a pair of clamping members carried by the conveyor for receiving and transferring a piece part from a first piece part centering station to a second centering station, said clamping members being interconnected and movable toward each other at the first centering station to center the piece part vertically therebetween, a pair of positioning members at the second centering station adapted to coact and thereby center the piece part horizontally between said clamping members in directions parallel and transverse to the longitudinal axis of the piece part, and means for driving said clamping members closer together located subsequent to the second centering station and actuated by subsequent conveyor movement so that the three-dimensionally centered piece part is firmly secured to the conveyor upon arrival at the work stations.

3. The machine tool as claimed in claim 2, wherein one of the positioning members comprises a positioning member mounted on said clamping members for horizontally positioning the piece part at the second centering station in one direction.

4. The machine tool as claimed in claim 2, wherein said pair of positioning members are fixedly mounted adjacent the second centering station.

5. A process-type machine tool including an endless conveyor and a succession of piece part centering and work stations disposed adjacent the conveyor, the tool comprising: a pair of clamping members carried by the conveyor for receiving and transferring a piece part from a first piece part centering station to a second centering station, said clamping members being interconnected and movable toward each other at the first centering station to loosely clamp and vertically center a piece part therebetween, first positioning means attached to said clamping members and movable therewith, said first positioning means adapted to horizontally center the piece part in said clamping members in one direction, second positioning means located at the second centering station and cooperating with said first means to horizontally center the piece part in another direction at substantially right angles to the one direction, and means for driving said clamping members closer together located subsequent to the second centering station and actuated by subsequent conveyor movement so that the three-dimensionally centered piece part is firmly secured to the conveyor upon arrival at the work stations.

6. A process-type machine tool including a rotary plate and a succession of piece part centering and work stations adjacent the rotary plate, the tool comprising: a pair of clamping members carried by the rotary plate for receiving and transferring a piece part from a first centering station to a second centering station, said clamping members being interconnected and movable toward each other at the first centering station to center the piece part vertically therebetween, camming means mounted on the rotary plate and positioned to move said clamping members toward each other, first means for driving said camming means upon rotation thereof from the first centering station so that said clamping members are driven together until the piece part is loosely clamped therebetween, piece part positioning members at the second centering station coacting to horizontally position the piece part at the second station in directions parallel and transverse to the longitudinal axis of the piece part, and second means located subsequent to the the second centering station for additionally driving said camming means into moving said clamping members closer together upon subsequent rotation of the rotary plate so that the three-dimensionally centered piece part is firmly secured by said clamping members to the rotary plate upon arrival at the work stations.

7. A process-type machine tool including an endless conveyor and a succession of piece part centering and work stations disposed adjacent the conveyor, the tool comprising: a pair of clamping members carried by the conveyor for receiving and transferring a piece part from a first piece part centering station to a second piece part centering station as a result of conveyor movement, said clamping members being interconnected and movable vertically so as to center the piece part therebetween at the first centering station, piece part positioning members at the second centering station operable to horizontally position the piece part indexed to the second centering station in said clamping members in directions parallel and transverse to the longitudinal axis of the piece part, a cam surface of varying contour disposed proximate the conveyor, camming means contacting said cam surface and pivoting upon contact with a variation in cam surface contour, said camming means being connected to the conveyor and positioned to drive said clamping members toward each other upon pivotal movement thereof, the cam surface having a contour variation subsequent to the first station such that said camming means drives said clamping members together with a force sufficient to clamp the piece part loosely therebetween, the contour of said cam surface varying subsequent to the second station such that subsequent movement of said camming means successively drives said clamping members to clamp the piece part firmly therebetween so that the piece part is three-dimensionally centered and firmly secured to the conveyor upon arrival at the work stations.

8. The machine tool as claimed in claim 7, wherein a resilient drive connection is provided between said camming means and said clamping members, said resilient connection being capable of imparting successively increasing forces to said clamping members upon successive pivotal movements of said camming means.

9. A process-type machine tool including a vertically disposed rotary plate and a succession of piece part centering and work stations disposed adjacent the rotary plate, the tool comprising: a pair of clamping members mounted on the rotary plate for receiving and transferring a substantially rectangular piece part from a first centering station to a second centering station as a result of plate rotation, said clamping members being interconnected and movable toward each other to center the piece part vertically therebetween, two pairs of piece part positioning elements at the second centering station operable to engage and horizontally position the piece part between the clamping members in directions parallel and transverse to the longitudinal axis of the piece part, a stationary cam mounted centrally of the rotary plate and having a substantially circular cam surface contour, a plurality of variations in cam surface contour, a revolvable follower member engaging said cam surface and movable in a radial direction upon contact with the variations in cam surface contour, a cam block pivotally connected to the rotary plate and mounting said follower member thereon such that radial follower movement causes pivotal movement of said cam block, first and second springs mounted on said cam block with the free ends thereof positioned to contact one of the clamping members upon pivotal movement of said cam block, said free ends being spaced apart a distance so that successive pivotal movements of said cam block impart successive driving forces to the one clamping member, a variation in cam surface contour occurring between the first and second centering stations of a size such that said cam block drives the free end of the first spring with a force sufficient to cause said clamping members to clamp loosely the piece part therebetween, another variation in cam surface contour occurring between the second centering station and the work stations and having a size such that the second spring is driven by cam block movement to act in conjunction with the first spring to move the clamping jaws whereby they firmly secure the piece part therebetween, the three-dimensionally centered piece part being thereby secured to the rotary plate on arrival at the work stations.

10. The machine tool as claimed in claim 9, wherein said first and second springs are leaf springs having different flexibility, said first spring being more flexible than said second spring so that said second spring imparts more force than said first spring to said clamping members upon pivotal movement of said cam block.

No references cited.